United States Patent [19]

Blaha

[11] Patent Number: 5,317,948
[45] Date of Patent: Jun. 7, 1994

[54] PRESSURE TRANSDUCER USING PERMANENT MAGNET AND OPPOSING VARIABLE MAGNETIC FIELD

[75] Inventor: John G. Blaha, Garden Grove, Calif.
[73] Assignee: Hughes Aircraft Company, Los Angeles, Calif.
[21] Appl. No.: 916,300
[22] Filed: Jul. 17, 1992
[51] Int. Cl.$^5$ .............................................. G01L 9/14
[52] U.S. Cl. ...................................... 73/701; 73/705; 73/745; 336/30; 250/231.19
[58] Field of Search .............. 73/722, 728, 701, 705, 73/729, 745, 4 R, 718; 336/30; 250/231.19, 231.1, 222.1

[56] References Cited
U.S. PATENT DOCUMENTS
3,113,459 12/1963 Slater .................................. 73/718

Primary Examiner—Richard E. Chilcot, Jr.
Assistant Examiner—Joseph L. Felber
Attorney, Agent, or Firm—W. K. Denson-Low

[57] ABSTRACT

An electromagnetic fluid pressure transducer is provided which uses the opposing magnetic fields of a permanent magnet and an electromagnet to sense a change in a differential force. The differential force is the result of a pressure applied to the unequal surface areas of two pistons attached to opposite poles of the permanent magnet. The differential force displaces the permanent magnet which activates a counter whose output controls the field strength of an electromagnet. The magnetic field of the electromagnet is varied by the counter output to counterbalance the differential force by interacting with the field of the permanent magnet. The field strength of the electromagnet is varied until the magnetic force is sufficient to overcome the differential force and return the permanent magnet to its original position which stops the counter. As a result, the counter output which changes in proportion to change in the ambient pressure acting against the pistons can be used to indicate pressure.

19 Claims, 1 Drawing Sheet

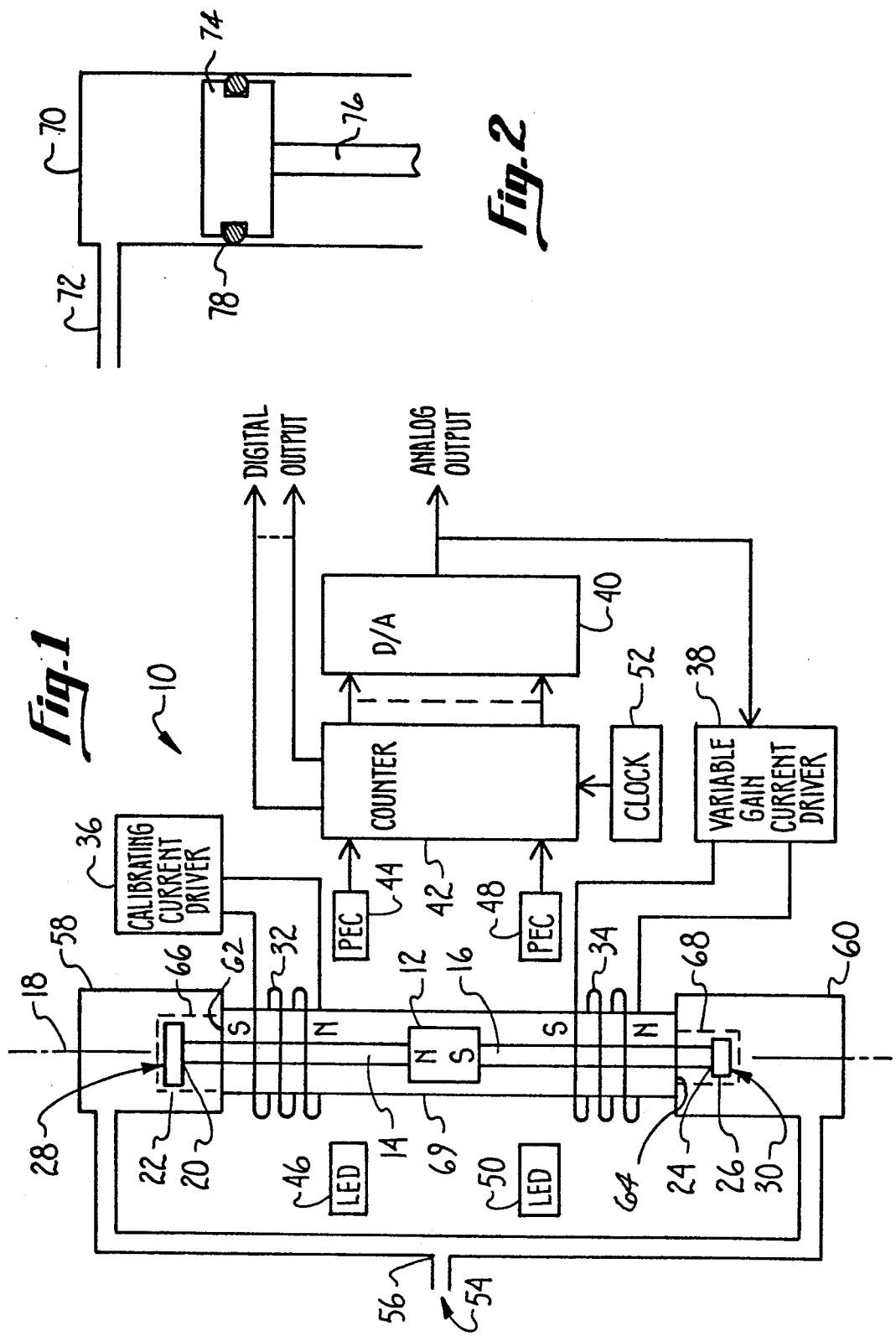

PRESSURE TRANSDUCER USING PERMANENT MAGNET AND OPPOSING VARIABLE MAGNETIC FIELD

The present invention relates to a transducer for measuring ambient pressure. More particularly, the present invention relates to a electromagnetic fluid pressure transducer. The present invention is particularly, although not exclusively, useful for measuring ambient fluid pressure and providing a linear output across an extremely wide pressure range.

BACKGROUND OF THE INVENTION

Pressure transducers are used in a variety of industries and applications. They are used in manned and unmanned underwater vehicles to measure depth. They are used in aircraft to measure altitude and to monitor pressure in the compression stages of jet engines. Additionally, hydraulic and pneumatic control systems use pressure transducers for pressure control. The single largest user of pressure transducers is the automotive industry which uses transducers to monitor engine intake manifold pressure in order to control electronic fuel injection systems and to determine shift points for automatic transmissions.

Pressure transducers are available in a variety of types. Among the most commonly used pressure transducers are bellows type transducers, spring/diaphragm type transducers and diaphragm/strain gauge type transducers. Bellows type transducers are widely used in applications such as barometers and aircraft altimeters. On the other hand, because of the inability of the bellows to handle moderate to high pressures, this type of transducer is limited to low pressure applications.

Spring/diaphragm transducers are commonly used in applications such as oxygen regulators. Spring/diaphragm transducers, however, have the drawback that they are inherently inaccurate because the spring and the diaphragm will fatigue over time. As the parts fatigue, the transducer must often be adjusted and calibrated to compensate for the changes in the materials.

Diaphragm/strain gauge transducers, while commonly used for high pressure applications such as torpedoes, still have several drawbacks. Since the total deflection in this type strain gauge may be very small, often measured in microns, precision machining and assembly is required. Often these devices have a limited range of use and mechanical stops must be used to prevent failures when exposed to pressures outside the allowable range. As a result of this limited range, multiple transducers having different ranges must often be used. In the design of diaphragm/strain gauge transducers, great care must be taken in the selection of materials to ensure that dissimilar materials having different temperature coefficients don't distort the diaphragm when the device is exposed to varying temperatures during operation. Moreover, the resistors in the strain gauge must be temperature compensated as well. Still further, care must be taken when assembling a diaphragm/strain gauge type transducer to minimize machining, welding and bonding stresses. This is necessary because these stresses, will relax over time and appear during operation as long term stability problems or drift. As a result of the foregoing, diaphragm/strain gage type transducers are relatively expensive.

The foregoing transducers universally rely on physical deformation of a mechanical part to monitor pressure. Over time all will need adjustment because of fatigue stresses and strains in the deforming member. This presents its own problem because most pressure transducers must be removed from their installed positions for testing and calibration. Another problem affecting all the above transducers, and briefly touched upon, above is that temperature affects their structural components and therefore their performance. Finally, the foregoing mechanical pressure transducers only approximate linearity and are subject to pressure bias offset if stressed beyond their design limit. These problems are the result of the incomplete or imperfect elasticity of the deforming mechanical component.

In light of the above it is an object of the present invention to provide a pressure transducer which is compact and easy to use. It is another object of the present invention to provide a pressure transducer which is able to detect small variations in pressure over wide range of pressures. It is still another object of the present invention to provide a pressure transducer which is reliable and accurate. Yet another object of the present invention is to provide a pressure transducer which is operationally rugged. And yet another object is to provide a pressure transducer which is not affected by operating temperatures or residual manufacturing or assembly stresses. It is another object of the present invention to provide a fluid pressure transducer having long-term stability. Yet another object of the present invention is to provide a pressure transducer which is relatively easy to manufacture and which is relatively economical.

SUMMARY OF THE INVENTION

The present invention is an electromagnetic pressure transducer for sensing pressure using the magnetic field of a permanent magnet and a variable opposing magnetic field of an electro-magnet to sense the differential force of a pressure applied to two pistons having unequal surface areas. More specifically, the device has as its primary component a displacible permanent magnet attached between a pair of pistons. Each of the pistons is attached to one of the poles of the magnet. Two pressure chambers are included in the device and are located on the displacement axis of the permanent magnet. One chamber is one the north pole side of the permanent magnet and the other is on the south pole side. Each chamber has an opening facing the permanent magnet which is covered by a diaphragm intersected by the magnet's displacement axis. Each of the diaphragms is in contact with the piston on its side of the permanent magnet. The pressure chambers are maintained at substantially equivalent pressures by connection to a conduit open to the fluid whose pressure is to be measured.

The pressure in the chambers acts across the diaphragms against the two piston head surfaces. This results in a force applied against the head surface of each of the pistons. Because the head surfaces of the two pistons are of unequal area, the resulting forces, while opposed to each other, are of unequal magnitude. This causes a force differential to act on the permanent magnet. In response to this differential force, the permanent magnet is movable along a displacement axis which is oriented on the magnet's polar axis. An electro-magnet is placed around the displacement axis to counter-balance the force differential by interacting with the field of the permanent magnet. A second electro-magnet, also interacting with the field of the permanent magnet is placed around the displacement axis for centering of the permanent magnet and for system calibration. At equilibrium the permanent magnet is held in a registered position since the forces resulting from fluid pressure on the piston heads counteract the force from the counterbalancing electro-magnet and the force from the calibrating electro-magnet. As the pressure changes, the force differential between the forces on the piston heads also changes. Consequently, the forces acting on the permanent magnet cause its displacement.

A pair of photo-electric cells are included in the device of the present invention and are located to receive light aimed across the displacement path of the permanent magnet. One cell is on either polar side of the permanent magnet so that, regardless of direction, as the magnet is displaced one or the other of the pair of cells is physically blocked from its light source by the magnet. The two photo-electric cells are connected to an electronic counter whose output increments or decrements if only one of the photo-electric cells is providing a current. On the other hand, if both of the cells are providing a current, then the counter output remains constant. The counter output controls a variable gain current driver which provides current to the counter-balancing electro-magnet. When a photoelectric cell discontinues providing a current as a result of the displacement of the permanent magnet, the counter output begins to increment or decrement, depending on which cell is currently blocked. When the counter output changes, it causes the current driver to alter the current provided to the counter-balancing electro-magnet. The counter output will continue to change until the force of the counter-balancing electro-magnet counteracts the force differential sufficiently to return the permanent magnet to its non-displaced or equilibrium position. When the permanent magnet reaches the equilibrium position both photo-electric cells again provide a current, the counter remains constant and the permanent magnet ceases moving. The constant counter output, in turn, provides steady current provided to the counter-balancing electromagnet steady and the system is again at equilibrium. Because the change in the output of the counter is proportional to the change in pressure, the transducer can be used to provide a reliable pressure reading.

The novel features of this invention, as well as the invention itself, both as to its structure and its operation, will be best understood from the accompanying drawings, taken in conjunction with the accompanying description, in which similar reference characters refer to similar parts, and in which:

BRIEF DESCRIPTION OF THE DRAWINGS

FIG. 1 is a component block diagram of the pressure transducer of the present invention; and FIG. 2 is a cross-sectional view of an alternate pressure chamber.

DESCRIPTION OF PREFERRED EMBODIMENTS

Referring initially to FIG. 1, the pressure transducer of the present invention is shown and generally designated 10. A permanent magnet 12 having a north and a south pole is present in the system. Fastened to the north pole of the permanent magnet 12 is a connecting rod 14. Rod 14 is made of a non-magnetic material such as plastic. Rod 14 can be connected to the permanent magnet 12 by a number of methods, including, but not limited to welding, bonding and screwing rod 14 to permanent magnet 12. A second connecting rod 16 is fastened to the south pole of the permanent magnet 12 in a similar fashion. Rods 14 and 16 are connected to the permanent magnet 12 such that they extend away from the permanent magnet 12 along the polar axis of the permanent magnet 12. Permanent magnet 12 is displacible along its polar axis which hereinafter will be referred to as the displacement axis 18 of the permanent magnet 12. Rod 14 has a distal end 20 to which a piston 22 is attached. Likewise, rod 16 has a distal end 24 and an attached piston 26. Piston 22 has a piston head surface 28 and piston 26 has a piston head surface 30. Piston 22 and piston 26 have unequal diameters and therefore unequal head surface areas. Typically, piston 22 has a greater head surface area than does piston 26. The piston head surfaces 2 and 30 lie in planes perpendicular to the displacement axis 18.

An electro-magnet 32 is placed around rod 14, between the piston 22 and the permanent magnet 12. Electro-magnet 32 has a north pole and a south pole. Electro-magnet 32 is placed such that its north pole is facing the north pole of the permanent magnet 12. A second electro-magnet 34 is placed around rod 16 between the piston 26 and the permanent magnet 12. Electro-magnet 34 has a north pole and a south pole and its south pole is closest to the permanent magnet 12 and its south pole. Electro-magnet 32 is connected to a calibrating current driver 36 and electro-magnet 34 is connected to a variable gain current driver 38.

Current driver 38 is connected to a digital to analog converter 40 which is also connected to an electronic counter 42. If current driver 38 can accept the digital output of the counter 42 directly, then the converter 40 is not required. Likewise, if the counter has an analog output, the converter 40 is not required. The assembly including the digital to analog conversion is the preferred assembly as it allows both analog and digital outputs from the transducer. The digital output comes directly from the output of the counter, and the analog output comes from the output of the digital to analog converter.

Counter 42 is connected to a photo-electric cell 44. The light source or LED 46 for the photo-electric cell 44 is positioned such that the source to cell path intersects the permanent magnet displacement path between the permanent magnet 12 and the electro-magnet 32. A second photo-electric cell 48 is connected to the counter 42 and its light source or LED 50 is positioned such that the source to cell path intersects the permanent magnet displacement path between the permanent magnet and electro-magnet 34. As those skilled in the pertinent art will appreciate, LED's 46 and 50 could be replaced by any other light source suitable for use with photo-electric cells without departing from the scope of the present invention. Likewise, it would also be possible to use a single light source and a mirror system to accomplish the same result as having two light sources. To control the rate of incrementing or decrementing of the counter, a clock 52 is also connected to counter 42.

Pressure transducer 10 further includes an input port 54 connected to a manifold 56 which is turn connected to a pressure chamber 58 and a pressure chamber 60. Chambers 58 and 60 are located on the displacement axis 18 of the permanent magnet 12. The side of chamber 58 nearest the permanent magnet 12 has an opening 62 and opening 62 is sealed by a flexible diaphragm 66. Similarly, a second flexible diaphragm 68 seals an opening 64 located the side of chamber 60 nearest the permanent magnet 12. Piston head surface 28 contacts diaphragm 66 and piston head surface 30 contacts diaphragm 68. Head surface to diaphragm contacts are such that both head surfaces remain in continual contact with their respective diaphragms during operation of pressure transducer 10. The piston head sides of the two diaphragms 66 and 68 are maintained at equal pressures through the use of an enclosure 69 between pressure chambers 58 and 60. In this manner, there is always an equal pressure differential across the two diaphragms 66 and 68.

Referring now to FIG. 2, an alternative piston/pressure chamber is shown. Pressure chamber 70 is a generally cylindrical chamber having an open end facing the permanent magnet. It is connected to the manifold 72 as before. The piston 74 is sized to closely fit the opening in the chamber 70. As before, the piston is connected to a rod 76. The seal between the chamber and the piston is accomplished through the use of at least one o-ring 78. Because of the increased resistance of the o-ring, this embodiment is only feasible for use in high pressure situations.

OPERATION

The fluid from which a pressure reading is desired enters the pressure transducer through input port 54. The fluid passes through manifold 56 and enters the pressure chambers 58 and 60. Once in the chambers, the fluid is in contact with the diaphragms 66 and 68. The resulting forces of the fluid pressure on the diaphragms are applied through the diaphragms to the piston head surfaces 28 and 30. These applied forces are opposing although unequal in magnitude. The inequality in the forces is the result of the inequality of the surface areas of the piston head surfaces 28 and 30 and given the fact that force is the product of pressure and surface area ($F = P \times A$). This resulting force inequality produces a force differential which acts upon the permanent magnet through the pistons and the rods. The effect of this force differential on the system will be addressed more fully below.

Electro-magnet 34 is used to counterbalance the force differential and to return the transducer to its equilibrium state. When in equilibrium, the permanent magnet is in its non-displaced position and the force deferential resulting from fluid pressure on the piston head surfaces is offset by the force resulting from the interaction between the magnetic field of the permanent magnet 12 and the magnetic field of the electro-magnets 32 and 34. Normally, the permanent magnet will center itself upon application of a small null current through electro-magnets 32 and 34. If the permanent magnet 12 is not perfectly in the non-displaced position at equilibrium, the permanent magnet 12 can be re-positioned by varying the field strength of the electro-magnet 32. The field strength of electro-magnet 32 can be varied by adjusting the current driver 36.

If the transducer is at equilibrium and the permanent magnet 12 is in the non-displaced position, photo-electric cell 44 and photo-electric cell 48 produce currents which are provided to the electronic counter 42. If counter 42 is receiving currents from both photo-electric cell 44 and photo-electric cell 48, the counter holds constant. As the counter 42 holds constant, its output to the digital to analog converter 40 and therefore the current driver 38 remains constant also. In this situation the output of the current driver 38, which energizes the electro-magnet 34 remains constant and the system is at equilibrium until the fluid pressure in the pressure chambers 58 and 60 changes.

When the pressure at the input port 54 changes, the pressure in the chambers 58 and 60 changes which in turn alters the force differential. When the force differential varies and the magnetic field of the counterbalancing electro-magnet 34 remains constant, the forces acting on the permanent magnet no longer are offsetting. Instead, a force deferential is created which acts on and displaces the permanent magnet. As soon as the permanent magnet is displaced it blocks one of the light paths between the photo-electric cells 44 and 48 and their light sources. If the system described above experiences increased fluid pressure, logic dictates that the force differential will increase and the permanent magnet 12 will move in the direction of the smaller piston head surface area. In the structure depicted in FIG. 1, the permanent magnet will move in the direction toward piston 26. This movement will prevent the light from LED 50 from reaching photo-electric cell 48 which in turn will discontinue its current to the counter 42. When counter 42 receives the current from photo-electric cell 44 only, it begins to increment. As it increments, its output increases which increases the output of the current driver 38 which in turn increases the field strength of the electro-magnet 34. The counter 42 will continue to increment and the field strength of electro-magnet 34 will continue to increase until the force of the permanent magnet and electro-magnet interaction is sufficient to overcome the increased force differential. Once the force differential is overcome, the permanent magnet 12 begins to move toward its non-displaced position. This movement then allows light from LED 50 to reach photo-electric cell 48 and the counter 42 stops incrementing. Permanent magnet 12 will continue to move until the force resulting from the interaction between the magnetic fields of the permanent magnet 12 and the electro-magnet 34 decreases and is no longer sufficient to overcome the force differential of the forces on the pistons. As those skilled in the art will appreciate, the permanent magnet 12 will eventually reach the equilibrium state and the system will hold steady until the next pressure change. Clearly, the system will operate in a similar manner if the pressure at the input port decreases, namely, the initial movement of the permanent magnet 12 would be toward the larger piston 22. At that point photo-electric cell 44 would discontinue its current to the counter 42, the counter would decrement decreasing the field strength of electro-magnet 34 and so on.

As is clear from the foregoing, the change in the output of the counter 42 will be linearly proportional to the change in the pressure and relative pressure, altitude or depth etc. can be determined. Further, as noted above, the transducer can output the counter value in analog or digital form depending on whether the output is taken before or after the counter output passes through the digital to analog converter 40.

As will be appreciated by those skilled in the art, the accuracy and the sensitivity of the transducer can be adjusted by varying the strength of the permanent magnet, the number of turns in the coils of the electro-magnets, the ratio of the diameters of the pistons, and the number of bits in the counter.

While the particular pressure transducer as herein shown and disclosed in detail is fully capable of obtaining the objects and providing the advantages herein before stated, it is to be understood that it is merely illustrative of the preferred embodiments of the invention and that no limitations are intended to the details of construction or design herein shown other than as defined in the appended claims.

I claim:

1. A device for determining ambient pressure of a fluid comprising:
    a permanent magnet disposed for movement along a displacement axis, said permanent magnet having a first pole and a second pole positioned on said axis;
    a first means connected to said permanent magnet and responsive to ambient pressure of said fluid for creating a first force against said permanent magnet along said displacement axis;
    a second means connected to said permanent magnet and responsive to said ambient pressure of said fluid for creating a second force against said permanent magnet in a direction opposite that of said first force, said second force being unequal to said first force to create a force differential related to said ambient pressure for moving said permanent magnet; and
    means for sensing the magnitude of said force differential and providing an output signal indicative of the ambient pressure.

2. The device as recited in claim 1 further comprising a means for calibrating including:
    an electro-magnet on said displacement axis, said electro-magnet having a magnetic field to interact with said magnetic field of said permanent magnet; and
    an adjustable current driver connected to said electro-magnet, said current driver controlling the field strength of said electro-magnet.

3. The device as recited in claim 2 wherein said means for sensing the magnitude of said force differential and providing an output signal indicative of the ambient pressure comprises a first and second photo-electric cell receiving light from at least one light source, said first and second photoelectric cells generating a first and second current, respectively, while receiving said light, a positive displacement of said permanent magnet blocking said light to said first photo-electric cell and a negative displacement blocking said light to said second photo-electric cell.

4. The device as recited in claim 3 wherein said means for sensing the magnitude of said force differential and providing an output signal indicative of the ambient pressure further comprises an electronic counter having a digital output and being connected to said first and second photo-electric cells, said counter decrementing when receiving only said second current from said second photo-electric cell, incrementing when receiving only said first current from said first photoelectric cell, and remaining constant when receiving both said first and second currents.

5. The device as recited in claim 4 wherein said counterbalancing means comprises:
    a digital to analog converter for receiving said digital output of said electronic counter and having an analog output proportional to said digital output;
    a second electro-magnet on said displacement axis; and
    a second current driver having an output current, said second current driver being connected to said second electro-magnet, said output current varying depending on said digital output of said electronic counter.

6. The device as recited in claim 1 wherein said means for sensing the magnitude of said force differential and providing an output signal indicative of the ambient pressure includes:
    a counterbalancing means for generating a counterbalancing force opposing said force differential;
    means for sensing the magnitude of said counterbalancing force and providing an output signal indicative of the ambient pressure.

7. The device as recited in claim 6 further comprising a means for calibrating including:
    an electro-magnet on said displacement axis, said electro-magnet having a magnetic field to interact with a magnetic field of said permanent magnet; and
    an adjustable current driver connected to said electro-magnet, said current driver controlling the field strength of said electro-magnet.

8. The device as recited in claim 6 wherein said first means comprises:
    a rod attached to said first pole of said permanent magnet, said rod having a distal end and being on said displacement axis;
    a pressure chamber being maintained at said ambient pressure and having an open end;
    a piston having a first diameter and being attached to said distal end of said rod, said piston being located in said open end of said pressure chamber to receive a force from said ambient pressure; and
    an interface between said pressure chamber and said piston, said interface providing a seal between said chamber and said piston.

9. The device as recited in claim 8 wherein said interface is a flexible diaphragm attached to said open end of said pressure chamber.

10. The device as recited in claim 8 wherein said interface is at least one o-ring around said piston.

11. The device as recited in claim 8 wherein said second means comprises:
    a second rod attached to said second pole of said permanent magnet, said second rod having a distal end and being on said displacement axis;
    a second pressure chamber being maintained at said ambient pressure and having an open end;
    a second piston having a second diameter and being attached to said distal end of said second rod, said second piston being located in said open end of said second pressure chamber to receive a second force from said ambient pressure; and
    a second interface between said second pressure chamber and said second piston, said second interface providing a seal between said second chamber and said second piston.

12. The device as recited in claim 11 wherein said second interface is a flexible diaphragm attached to said open end of said second pressure chamber.

13. The device as recited in claim 11 wherein said second interface is at least one o-ring around said second piston.

14. A device for providing a pressure dependent output comprising:
    a displaceable member including a permanent magnet having a north and a south pole, a magnetic field, and a polar axis, a first piston having a head surface and being attached to said north pole, a second piston having a head surface and being attached to said south pole, said first and said second piston having unequal head surface areas, said displaceable member being displaced by a force differential resulting from ambient fluid pressure acting against said unequal piton head surfaces;

a first electro-magnet on said polar axis interacting with said magnetic field of said permanent magnet to counterbalance said force differential;

a second electro-magnet on said polar axis having a magnetic field for calibrating said sensing device by interacting with said magnetic field of said permanent magnet;

an electronic counter having a digital output, said output remaining steady, incrementing or decrementing depending on the displacement of said displaceable member, said output of said electronic counter varying the output current of a current driver, said current passing through said first electro-magnet and generating a magnetic field to interact with said magnetic field of said permanent magnet; and a indicating means for signaling to said counter said displacement of said displaceable member.

15. A method for providing a pressure dependent output comprising the steps of:

maintaining a first and a second pressure chamber at ambient pressure;

producing partially offsetting forces from said pressure in said chambers, said forces resulting in a force differential;

displacing a permanent magnet along a displacement axis with said force differential, said displacement being either a positive or a negative displacement depending on the force differential;

signaling an electronic counter when and in what direction said permanent magnet is displaced;

regulating a pressure dependent output of said electronic counter based on said displacement;

varying the field strength of an electro-magnet placed along said displacement axis to counterbalance said force differential, said field strength being varied using a variable gain current driver controlled by said output of said electronic counter, said varying of said field strength returning said permanent magnet to a non-displaced position; and providing said pressure dependent output.

16. The method as recited in claim 15 further comprising the step of calibrating said non-displaced position using an electro-magnet placed along said displacement axis.

17. The method as recited in claim 15 wherein said producing step comprises the sub-steps of:

placing a first piston head surface of a first piston in contact with said pressure in said first pressure chamber, said first piston being attached to a north pole of said permanent magnet;

placing a second piston head surface of a second piston in contact with said pressure in said second pressure chamber, said second piston being attached to a south pole of said permanent magnet, said first and said second piston head surfaces having unequal areas.

18. The method as recited in claim 15 wherein said signaling step comprises the steps of:

receiving light from a light source at both a first and a second photo-electric cell when said permanent magnet is in the non-displaced position;

receiving said light at said first photo-electric cell, but not at said second photo-electric cell when the permanent magnet has said positive displacement;

receiving said light at said second photo-electric cell, but not at said first photo-electric cell when the permanent magnet has a negative displacement;

providing a current to said counter from said first photo-electric cell when said first photo-electric cell receives light from said light source; and providing a current to said counter from said second photo-electric cell when said second photo-electric cell receives light from said light source.

19. The method as recited in claim 18 wherein said regulating the output step comprises the steps of:

maintaining said counter output constant when said counter receives said currents from both said photo-electric cells;

incrementing said counter output when said counter receives said current from said first photo-electric cell only; and decrementing said counter output when said counter receives said current from said second photo-electric cell only.

* * * * *